Feb. 28, 1928.

H. E. EVERSMANN 1,660,706

INTERNAL COMBUSTION ENGINE

Filed May 4, 1925   3 Sheets-Sheet 1

Inventor

Henry E. Eversmann

By James N. Ramsey

Attorney

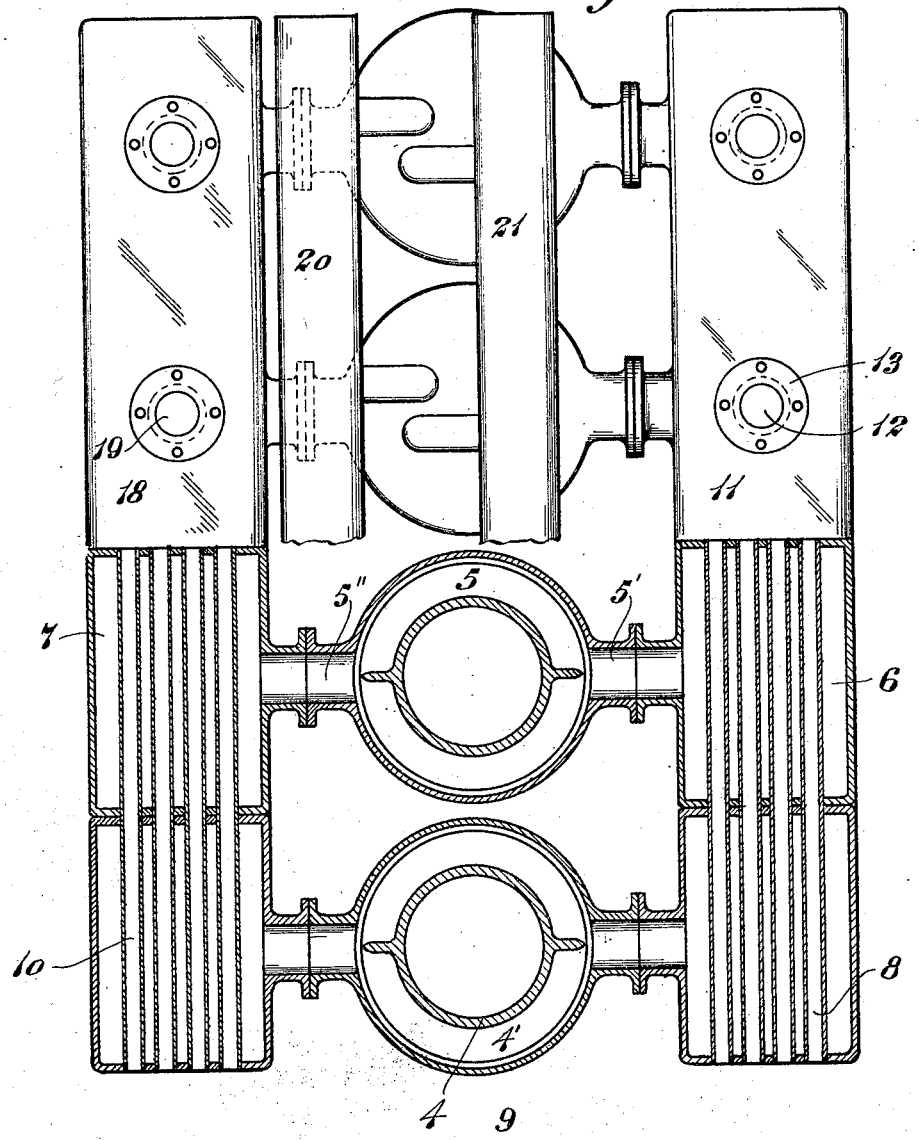

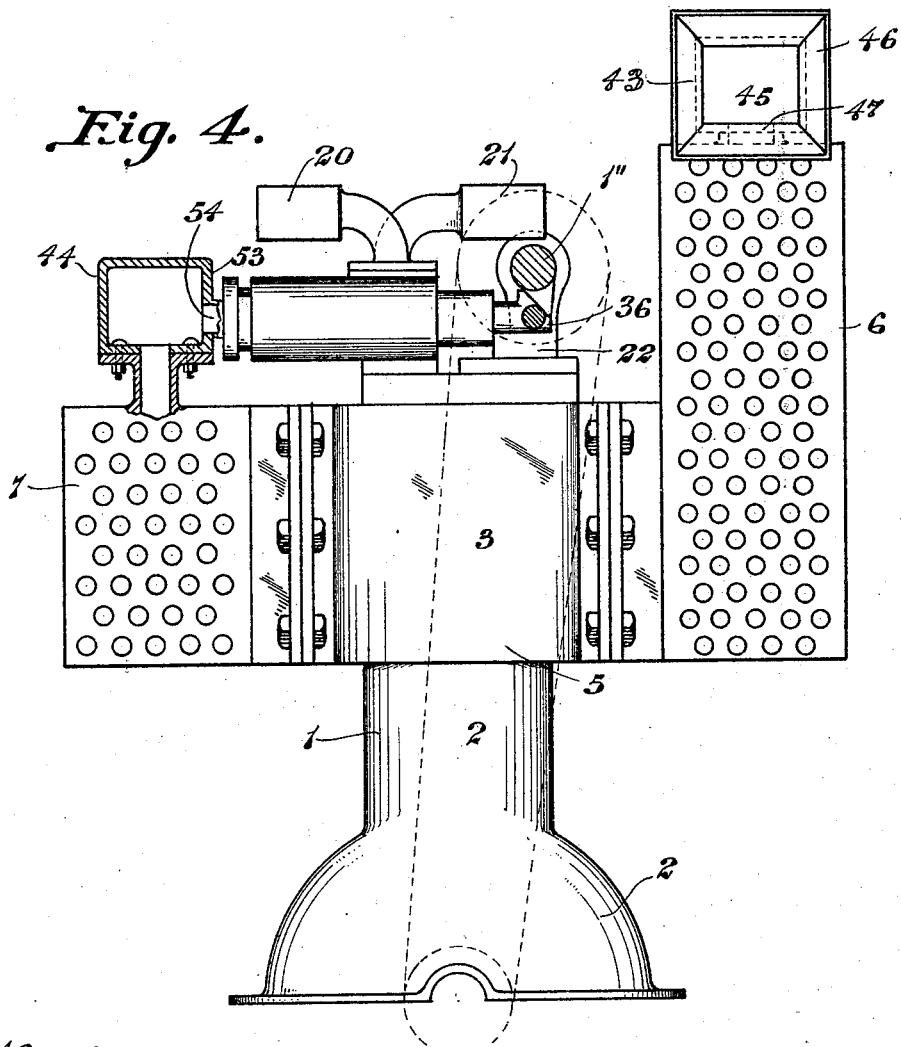
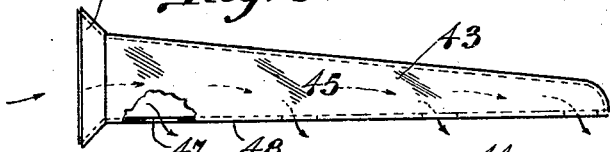
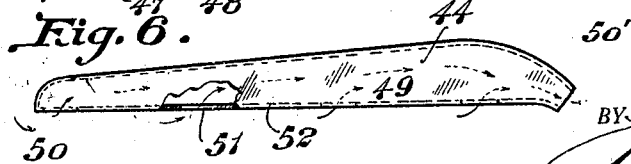

Patented Feb. 28, 1928.

1,660,706

UNITED STATES PATENT OFFICE.

HENRY E. EVERSMANN, OF CINCINNATI, OHIO.

INTERNAL-COMBUSTION ENGINE.

Application filed May 4, 1925. Serial No. 27,812.

My invention relates to means for maintaining the cylinders of an internal combustion engine at a relatively low temperature.

Heretofore it has been customary to construct internal combustion engines with either water cooled or air cooled cylinders and without the provision for conveniently converting the engine adapting it to utilize water instead of air as a cooling agency and vice versa.

In engines utilizing water to cool the cylinders the usual construction comprises a tubular or circular radiator positioned adjacent and connected with the water jackets of the engine block whereby water is caused to circulate, by thermo-siphon, or force feed action from the water jackets of the cylinders through the radiator and then again into and through the water jackets of the cylinders. No provision is made to cool the intake and exhaust valves which soon become pitted and partly consumed by the excessive heat generated in the cylinders, thereby permitting the compression to gradually escape from within the cylinders, whereby the horse-power of the engine is considerably reduced, as well as materially effecting the smooth and noiseless running of the engine. Furthermore, water-cooled engines usually have the cylinders arranged in alinement whereby the cylinders adjacent the water input supply pipe from the radiator is adapted to be more efficiently cooled than the cylinders which are further removed from the input supply pipe, inasmuch as the same water supply is utilized to cool the various cylinders and for the reason that the temperature of the water is elevated to such a high degree as it passes through the water-jackets and in contact with the heated cylinders that it is incapable of effectively cooling the last cylinders which are contacted by it. I have found that water, in preference to air, is considerably more effective as a cooling agency for engine cylinders during summer months and that air is a more desirable and efficient cooling agency during winter months. This is especially true of motor vehicles and other engines which are operated under various and ununiform atmospherical conditions.

The objects of my invention are to provide a simple, efficient and economical convertible water-cooled and air-cooled internal combustion engine; to provide means adapted to utilize water to cool each cylinder of said engine separately from and irrespective of one another; to provide means adapted to utilize air to cool each cylinder of said engine separately from and irrespective of one another; and to provide means adapted to maintain the valves of said engine at a relatively low temperature irrespective as to whether water or air is employed as a cooling agency.

My invention consists in providing a thermo-siphon water cooling system for an internal combustion engine wherein each cylinder of said engine is positioned intermediate a main radiator and an auxiliary radiator having connection with each other and the water-jacket of said cylinder whereby water is adapted to circulate from said auxiliary radiator to said water-jacket, then to said main radiator and then to said auxiliary radiator, thereby providing a separate cooling system for each cylinder irrespective of other cylinders; in providing a plurality of air tubes extending commonly through each of said main and said auxiliary radiators, respectively; in providing a passage through each of said intake and exhaust valves whereby the engine cooling agency is adapted to circulate therethrough; and in providing means whereby water can be quickly substituted for air as a cooling agency of said engine.

My invention also consists in the combination, location and arrangement of parts and in the details of construction, as herein set forth and claimed:

In the drawings:

Fig. 3 is a view showing the front portion of the invention in horizontal section and showing a plan view of the rear portion with parts removed;

Fig. 4 is a front elevation showing the invention converted to utilize air for the cooling agency of its cylinders and showing portions broken away and parts in vertical section;

Fig. 5 is a side elevation of the main radiators air distributor with parts broken away; and Fig. 6 is a side elevation of the auxiliary radiators air distributer with parts broken away.

Figure 1:
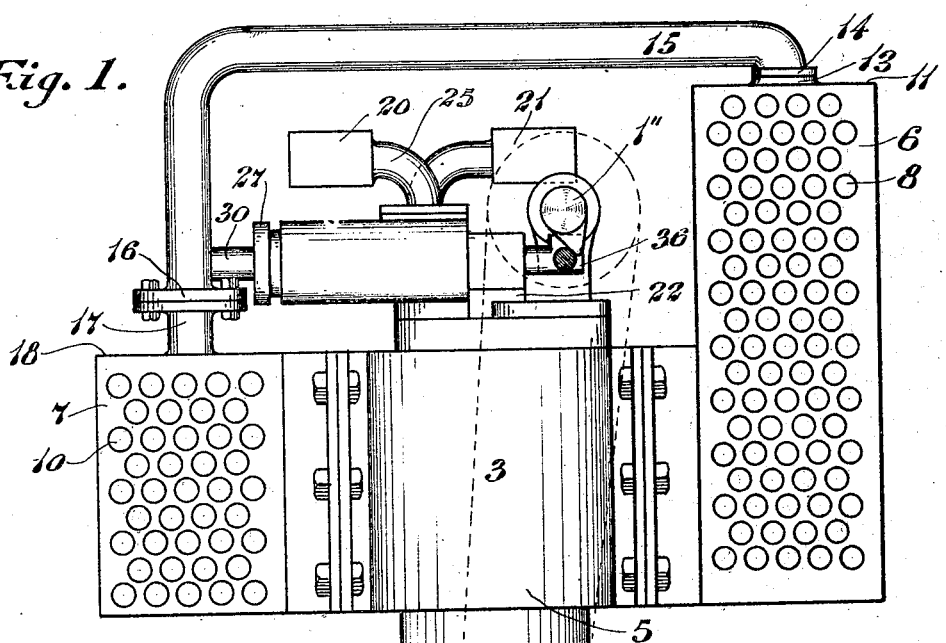
Fig. 1 is a front elevation of the invention converted for utilizing water for the cooling agency of its cylinders.

In the preferred construction of my invention I provide internal combustion engine 1 comprising lower portion 2 and upper portion 3 of cylinders 4, respectively, having water-jackets 5 mounted therearound. Each cylinder has a plurality of equi-distant spaced apart and outwardly extending circular fins 4' integrally connected with its outer periphery for the purpose of providing a considerable area of surface for heat radiating purposes. Passages 5', respectively, connect water jackets 5 on one side, respectively, with main radiators 6 and passages 5'', respectively, connect the other side of the water-jackets, respectively with auxiliary radiators 7. Alined main radiators 6, respectively, and alined auxiliary radiators 7, respectively are oppositely disposed from alined cylinders 4 and extend in parallel relation thereto. Spaced apart air tubes 8, extending parallel with alined cylinders 4 and through alined main radiators 6, are for the purpose of reducing the temperature of the cooling agency (usually water) within the main radiators, as by currents of air passing through tubes 8 from front 9 of the engine to the rear and traversing through all of the main radiators which extend the complete length of engine 1. Auxiliary radiators 7 also have equi-distant spaced apart air tubes 10 extending commonly therethrough whereby a relatively low temperature of the cooling agency in each of the auxiliary radiators is maintained as by currents of air flowing through the tubes from front 9 of the engine.

Each main radiator 6 has cover 11 suitably fixed thereto. In each cover 11 there is a centrally disposed circular opening 12 having union 13 registering therewith and suitably fixed to the cover, whereby when water is utilized as a cooling agency of engine 1 ends 14, respectively, of pipes 15 are, respectively and suitably, secured to unions 13. The other ends 16, respectively, of pipes 15 are, respectively and suitably, secured to unions 17, respectively and suitably, secured to covers 18, respectively, fixed to the tops of the auxiliary radiators. Unions 17, respectively, are fixed in registering position with openings 19, respectively, in covers 18, whereby water is adapted to circulate by thermo-siphon action through each of the water-jackets 5, passages 5'', auxiliary radiators 7, pipes 15, main radiators 6 and passages 5' whereby contact of the water with tubes 8 and 10, respectively, extending through main radiators 6 and auxiliary radiators 7 maintains the water at a relatively low temperature, which maintains a relatively low temperature of cylinders 4.

Extending in parallel relation with each other and with cylinders 4 is exhaust manifold 20 and intake manifold 21, respectively, connected with the usual exhaust pipe and carbureter (not shown).

Figure 2:
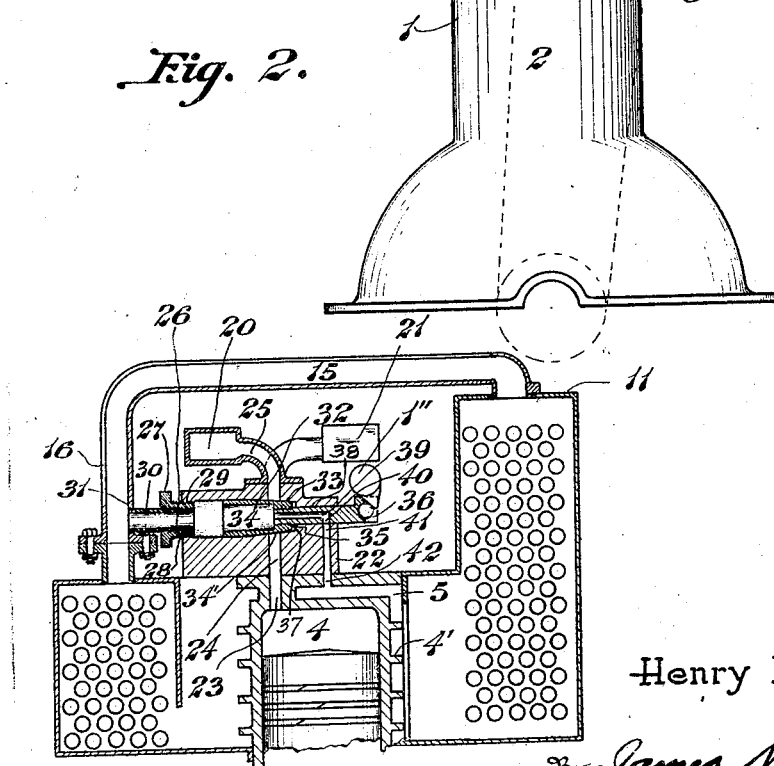
Fig. 2 is a vertical section of the same and showing parts broken away.

Each of the exhaust valves and intake valves are constructed similarly and a description of an intake valve, clearly shown in section in Fig. 2, will suffice for both structures.

Valve support block 22, suitably secured to the upper portion 3 of engine 1 has vertical passage 23 therein leading through the inner top of cylinder 4 and registering with vertical passage 24 which extends through the valve support block and leads into pipe 25 connected with exhaust manifold 20. Extending through valve support block 22, is horizontal circular passage 26 in intersecting relation with vertical passage 24. Nut 27 is externally threaded in outer end 28 of circular passage 26 in block 22 for the purpose of receiving threaded end 29 of pipe 30 having its other end 31 threaded in end 16 of pipe 15, whereby water is adapted to be conveyed from pipe 15 into passage 26 in valve support block 22 for purposes fully explained hereinafter.

The central portion 32 of passage 26 is uniformly tapered inwardly thereby forming valve seat 33 for receiving tapered end 34' of tubular sleeve valve 34 having inner end 35 of valve stem 36 threaded thereto. Shoulder 37 is formed in the valve support block in passage 26 as by end portion 38 of passage 26 being reduced in size. Valve stem 36 is slidably mounted in end portion 38 of passage 26 and is adapted to have reciprocative motion imparted thereto by means of usual cam 1' of usual rotatable cam shaft 1'' whereby reciprocative movement is imparted to sleeve valve 34.

For the purpose of maintaining a relatively low temperature of valve 34, irrespective of the excessive heat generated in cylinder 4 caused by continuous ignition and explosion of gas charges therein, I provide longitudinal passage 39 in valve stem 36 leading from the inner end 35 of the valve stem. The outer end 40 of passage 39 is adapted to register with the upper end of vertical passage 41 in valve support block 22 when valve 34 is in closed position, as shown in Fig. 2. The lower end of vertical passage 41 registers with passage 42 (in cylinder 4) which leads into water-jacket 5, which, as heretofore explained, has communicating connection with main radiator 6 and auxiliary radiator 7, respectively, through passage 5' and 5'', whereby rotation of cam shaft 1'' which is adapted simultaneously to impart reciprocative movement to valve stem 36 and valve 34, thereby alternately opening and closing the valve passage (which leads through passages 42, 41, 39, tubular valve 34 and pipe 30) as by alternately sliding end 40 of hole 39 in and out of registering or communicating position with vertical passage 41 in valve support block 22, whereby sufficient water is permitted to pass from the main radiator through valve 34 to maintain the valve at a relatively low temperature, thereby preventing the valve and its seat from becoming pitted and consumed by excessive heat.

The reciprocative action of valve 34 provides for alternately opening and closing the passage from the interior of cylinder 4 to exhaust manifold 20 through passages 23, 24 and pipe 25, thereby permitting the burned gas fumes within the cylinder to escape through the exhaust pipe (not shown).

The intake valve of each cylinder, as heretofore explained, is similarly constructed to the exhaust valve and, as is well known, instead of permitting the escape of burned gas fumes from a cylinder is adapted to open and close alternately to permit entrance of explosive gases from intake manifold 21 into the cylinder during a period of time when the exhaust valve is in closed position, as shown in Fig. 2.

In Fig. 4 I show a modified form of my invention in which air is substituted for water and is utilized as a cooling agency for cylinders 4, exhaust and intake valves 34. To convert engine 1 from a water-cooled to an air-cooled construction it is necessary to drain the water from engine 1, radiators 6 and 7, remove pipes 15 and connect air distributers 43 and 44, respectively, to the covers 11 and 18, respectively, of main radiators 6 and auxiliary radiators 7. Air distributer 43 is connected to covers 11, respectively, of main radiators 6 so that its body 45 extends longitudinally of the radiators and with flared end 46 adjacent front 9 of engine 1 and with holes 47 (in bottom 48), respectively, in registering position with holes 12, respectively, in the covers of main radiators 6 and suitably secured to unions 13. Air distributer 44 is connected to covers 18, respectively, of auxiliary radiators 7, in such a manner that its body 49 extends longitudinally of the auxiliary radiators and with its end 50 positioned adjacent front 9 of engine 1 with holes 51 (in bottoms 2), respectively, and suitably secured to unions 17 in registering positions with holes 19, respectively, in covers 18, respectively, of the auxiliary radiators. Pipes 30, respectively, are then connected with side 53 of air distributer 44 and in registering position with holes 54 in the air distributer, whereby the exhaust and intake valves are adapted to be maintained at a relatively low temperature as by currents of air traversing passages 42, 41, 39, tubular valves 34 and pipes 30, when the tubular valves are positioned so that passage 39 in valve stem 36 is in registering or communicating position relative to passage 41 in valve support block 22.

When air is utilized as a cooling agency for cylinders 4 the currents of air enter flared end 46 of air distributer 43 and pass through holes 47 in the bottom of the air distributer and through holes 12, respectively, in covers 11 of main radiators 6, and then travel through passages 5', jackets 5, passages 5'' and into auxiliary radiators 7 and through holes 19, respectively, in covers 18, respectively, of the auxiliary radiators and into air distributer 44 passing through its end 50' which is positioned toward the rear of engine 1. The cylinders 4 are maintained at a relatively low temperature, as by the currents of air contacting the exterior of the cylinders and the fins 4'.

When it is desirable to substitute a liquid for air as a cooling agency of cylinders 4 it is necessary merely to remove air distributers 43 and 44 and reconnect pipes 15 and then fill main radiators 6 and auxiliary radiators 7 with the required quantity of water or other suitable liquid.

It is apparent that I have invented a simple and effective means for maintaining the cylinders of an internal combustion engine at a relatively low temperature, whereby each cylinder is cooled irrespective of the other cylinders.

An advantage of my invention is that during the summer months water may be utilized as a cooling agency for the cylinders of an internal combustion engine, whereas during the winter months when, for various reasons water is an undesirable cooling agency, my invention may be quickly and conveniently converted so that air may be substituted for water, thereby providing a convertible cooling system particularly applicable to render the highest efficiency in various weather and other conditions under which the engine may be operated.

Another advantage of my invention is that efficient means are provided for cooling the intake and exhaust valves which heretofore have caused considerable trouble and expense in internal combustion engines, inasmuch as the excessive heat generated by the ignited and exploded gas within the cylinders is adapted to quickly pit the valve heads and warp the valve stems, whereby it is impossible to maintain compression within the cylinders without considerable loss of power. It is well known that as soon as the valves become pitted considerable of the useful power of the engine is wasted because of the escape through the valve seats of the compressed gases and also the smooth and noiseless operation of the engine is materially affected. Furthermore, it is necessary to regrind the usual type of valves at frequent intervals of time for the purpose of providing air-tight seating connections of the valve heads with respect to their seats, whereby considerable expense is occasioned not only as a result of the labor cost of regrinding the valves but also considerable time is necessarily consumed in dismantling and reassembling the various parts of the engine and the valves.

A further advantage of my invention is that when air is utilized as a cooling agency of the cylinders, each jacket of the cylinders is provided with outside air of the same temperature and irrespective of the other cylinders whereby all of the cylinders are maintained at relatively the same temperature.

When my invention is incorporated in automobiles, tractors, aeroplanes or other engines operated in outside and non-uniform temperatures which vary in accordance with the different seasons of the year, air may be substituted for water, as a cooling agency and vice versa when desirable and depending upon the peculiar service required to be rendered by the engine. When my invention is incorporated in internal combustion engines stationarily employed within buildings wherein a uniform temperature is maintained throughout the year it may be desirable to utilize either air or water as a cooling agency over the entire period of use of the engine without the necessity of changing the cooling agency of the cylinders from water to air or vice versa.

I realize that the conditions and uses of my invention will vary considerably and I desire to emphasize the fact that while I have chosen to illustrate the form and construction of my invention by the accompanying drawings and explanations of the same, the form and construction, as relates thereto are not intended to include all of the various forms and structures, in which my invention may be incorporated. It is understood that my invention resides in the combination, arrangement and location of parts and in the details of construction, as hereinafter claimed, and that changes in the precise embodiment of the invention, can be made within the scope of what is claimed without departing from the spirit of the invention.

What I claim as new and desire to secure by Letters Patent is:

1. In combination with an internal combustion engine having a plurality of cylinders, each of said cylinders having a water jacket, a pair of radiators connected with each of said water jackets, means whereby direct communication is established between each pair of radiators, air spaces extending through each of said radiators, and a passage leading from each radiator to its cooperating radiator whereby water is adapted to circulate from one radiator to its cooperating radiator through passages and water jackets independently of the other pairs of radiators, passages and water jackets.

2. In combination with an internal combustion engine having a plurality of cylinders, each of said cylinders having a water jacket, radiators connected in pairs with said water jackets, respectively, means whereby direct communication is established between each pair of radiators, a plurality of spaced apart air tubes extending through said radiators, and means for continuously conveying water from one radiator of each pair through one of said water jackets to the other radiator connected to said water jacket.

3. In combination with an internal combustion engine having a plurality of cylinders each of said cylinders having a water jacket, radiators connected in pairs with said water jackets, respectively, means whereby direct communication is established between each pair of radiators, air spaces extending through said radiators, and means for conveying water from one radiator to its cooperating radiator.

4. In combination with an internal combustion engine having a plurality of cylinders each of said cylinders having a cooling jacket, radiators connected in pairs with said cooling jackets, respectively, means whereby direct communication is established between each pair of radiators, air spaces extending through said radiators, and means for conveying a cooling agent continuously from one radiator to its cooperating radiator.

5. In combination with an internal combustion engine having a plurality of cylinders arranged in spaced apart relation with one another, a cooling jacket around each of said cylinders, a pair of radiators for each of said cooling jackets, removable means whereby direct communication is established between each pair of radiators, and means connecting each pair of radiators with each of said cooling jackets, respectively, whereby the cooling medium within each pair of radiators is adapted to simultaneously circulate from one radiator to the other around each of the corresponding jackets.

6. In combination with an internal combustion engine having a plurality of cylinders arranged in spaced apart relation with one another, a cooling jacket around each of said cylinders, a pair of oppositely disposed radiators for each of said cooling jackets, removable means whereby direct communication is established between each pair of radiators, and a plurality of spaced apart horizontally disposed air tubes in each of said radiators.

7. In combination with an internal combustion engine having a cylinder, a cooling jacket around said cylinder, a pair of radiators connected with said cooling jacket, means whereby direct communication is established between each pair of radiators, and a plurality of spaced apart air tubes extending horizontally through said radiators whereby the continuous circulation of the cooling medium between the radiators and the cooling jacket is further cooled.

8. In combination with an internal combustion engine having a plurality of cylinders arranged in spaced apart relation with one another, a cooling jacket around each of said cylinders, a pair of oppositely disposed radiators for each of said cooling jackets, and a plurality of spaced apart horizontally disposed air tubes in each of said radiators.

9. In combination with an internal combustion engine having a plurality of cylinders therein, a cooling jacket around each of said cylinders, a pair of radiators for each of said cooling jackets, removable means whereby direct communication is established between each pair of radiators, means connecting each pair of radiators with each of said cooling jackets, respectively, whereby a liquid cooling medium within each pair of radiators is adapted to simultaneously circulate from one radiator to the other around each of the corresponding jackets, and air distributors, respectively, adapted to be detachably substituted for said removable means whereby air may be circulated through said jackets instead of a liquid medium.

HENRY E. EVERSMANN.